US011681945B2

(12) United States Patent
Barton et al.

(10) Patent No.: US 11,681,945 B2
(45) Date of Patent: Jun. 20, 2023

(54) DISTRIBUTED LEARNING MODEL FOR FOG COMPUTING

(71) Applicant: Cisco Technology, Inc., San Jose, CA (US)

(72) Inventors: Robert Edgar Barton, Richmond (CA); Jerome Henry, Pittsboro, NC (US); Abhishek Kumar, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 1058 days.

(21) Appl. No.: 16/298,465

(22) Filed: Mar. 11, 2019

(65) Prior Publication Data

US 2020/0293925 A1  Sep. 17, 2020

(51) Int. Cl.
*G06N 20/00* (2019.01)
*G06F 9/50* (2006.01)
*G06F 11/30* (2006.01)
*G06N 5/043* (2023.01)

(52) U.S. Cl.
CPC .......... *G06N 20/00* (2019.01); *G06F 9/505* (2013.01); *G06F 11/3006* (2013.01); *G06N 5/043* (2013.01)

(58) Field of Classification Search
CPC .......... G06N 20/00; G06N 5/04; G06N 5/043; G06F 9/46; G06F 9/50; G06F 9/505; G06F 9/5005; G06F 11/30; G06F 11/34; G06F 11/3006; G06F 11/3409; G06F 11/3495; G06F 2201/81; G05B 19/05; G05B 19/4083

USPC .......................................................... 706/12
See application file for complete search history.

(56) References Cited

U.S. PATENT DOCUMENTS

| 10,050,697 | B2* | 8/2018 | Bennett ...................... H01P 3/10 |
| 11,556,808 | B1* | 1/2023 | Kim ........................ H04L 67/10 |
| 2017/0048308 | A1* | 2/2017 | Qaisar ................ H04L 41/0895 |
| 2017/0366472 | A1* | 12/2017 | Byers ..................... H04L 67/289 |
| 2018/0285767 | A1* | 10/2018 | Chew ...................... H04L 67/56 |
| 2018/0309821 | A1* | 10/2018 | Byers ...................... H04L 67/12 |
| 2018/0316555 | A1* | 11/2018 | Salgueiro ............ H04L 41/0816 |
| 2019/0034892 | A1* | 1/2019 | Smith ................ G06Q 20/1235 |

(Continued)

FOREIGN PATENT DOCUMENTS

| CN | 107172166 A | 9/2017 |
| WO | 2019/071101 A1 | 4/2019 |
| WO | 2020/095313 A1 | 5/2020 |

OTHER PUBLICATIONS

Mohammadi, Mehdi, et al., "Deep Learning for IoT Big Data and Streaming Analytics: A Survey," Jun. 5, 2018, pp. 1-40.

*Primary Examiner* — James N Fiorillo
(74) *Attorney, Agent, or Firm* — Polsinelli (57) ABSTRACT

The disclosed technology relates to a process for metered training of fog nodes within the fog layer. The metered training allows the fog nodes to be continually trained within the fog layer without the need for the cloud. Furthermore, the metered training allows the fog node to operate normally as the training is performed only when spare resources are available at the fog node. The disclosed technology also relates to a process of sharing better trained machine learning models of a fog node with other similar fog nodes thereby speeding up the training process for other fog nodes within the fog layer.

11 Claims, 5 Drawing Sheets

(56) References Cited

U.S. PATENT DOCUMENTS

| | | | |
|---|---|---|---|
| 2019/0079898 A1* | 3/2019 | Xiong | G06F 9/5072 |
| 2019/0080233 A1* | 3/2019 | Procter | G06N 3/08 |
| 2019/0138934 A1* | 5/2019 | Prakash | G06V 10/7747 |
| 2019/0163530 A1* | 5/2019 | Tien | H04L 67/10 |
| 2019/0164087 A1* | 5/2019 | Ghibril | G06N 5/02 |
| 2019/0309821 A1 | 10/2019 | Manzoor | |
| 2019/0318268 A1* | 10/2019 | Wang | H04L 67/10 |
| 2019/0324856 A1* | 10/2019 | Zhao | G06N 20/00 |
| 2020/0027033 A1* | 1/2020 | Garg | G06F 17/18 |
| 2020/0042362 A1* | 2/2020 | Cui | G06F 9/505 |
| 2020/0050951 A1* | 2/2020 | Wang | G06N 20/00 |
| 2020/0101603 A1* | 4/2020 | Satou | B25J 9/163 |
| 2020/0174840 A1* | 6/2020 | Zhao | G06F 9/547 |
| 2020/0265301 A1* | 8/2020 | Burger | G06N 5/04 |
| 2020/0285939 A1* | 9/2020 | Baker | G06F 18/24 |
| 2020/0293942 A1* | 9/2020 | Barton | G06F 9/5005 |
| 2021/0073047 A1* | 3/2021 | Bhandaru | G06F 9/505 |
| 2021/0117758 A1* | 4/2021 | Pérez Rico | H04L 67/125 |

* cited by examiner

DISTRIBUTED LEARNING MODEL FOR FOG COMPUTING

TECHNICAL FIELD

The subject matter of this disclosure relates in general to the field of fog computing, and more specifically for a distributed learning model for fog computing.

BACKGROUND

Fog computing is a distributed model where analytics, applications, and other software functions are placed close to the edge of the network. Fog computing reduces or suppresses the amount of data being sent to the cloud as many of the tasks are instead performed in real-time near the edge of the network at edge devices. In this way, fog computing can improve response time and efficiency by performing analytics and other tasks closer to where the data originates and/or resides as opposed to sending the information into the cloud.

However, fog nodes are typically constrained devices with limited performance. Therefore, this makes any optional tasks on these devices difficult as there needs to be a balance between the resources needed for normal operation of the fog node and the resources needed for the optional tasks.

There is interest in using cloud resources to train machine learning models for the fog node to use in operation. However, there are a number of issues related to relying on the cloud to train the models for the fog node. For example, once deployed, the machine learning models for the fog node are not further trainable without again communicating with the cloud. Furthermore, each time the machine learning model needs to be trained using the cloud, the training not only requires a large amount of cloud-related resources from the network but also subsequent training does not take into account the contextual data of the network where the fog node resides.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

Disclosed herein are computer-implemented methods, computer-readable media, and systems for training a fog node in the fog layer. The training of the fog nodes in the fog layer is carried out by each of the fog nodes by first receiving an initially trained machine learning model that is trained via the cloud. Each of the fog nodes then monitor resources being used at the fog node in order to identify a threshold amount of resources that is needed for normal operations. As referenced herein, "normal operations" refers to what the fog node typically does (i.e. its function) and an amount of resources for carrying out the respective function. Based on the identified threshold, the fog nodes are able to identify when spare resources are available when less than the threshold amount of resources needed for normal operations is currently being used. The fog nodes are then able to allocate the identified spare resources for the purpose of training the machine learning model. The fog nodes then use the identified spare resources to train the machine learning model.

Disclosed herein are also computer-implemented methods, computer-readable media, and systems for sharing trained machine learning models between fog nodes in the fog layer. The sharing identifies a first fog node in the fog layer that has a trained machine learning model that can be shared with other fog nodes in the fog layer. Next, similar fog nodes in the fog layer to the first fog node are identified. The similarity between two fog nodes is based on their respective location as well as shared characteristics. Once a group of similar other fog nodes have been identified, a determination of whether the sharing of the trained machine learning model from the first fog node would actually benefit the other fog nodes is made. If such a determination is reached that the sharing of the trained machine learning model would benefit the other fog nodes, the trained machine learning model is provided accordingly.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present description provides details regarding metered training of fog nodes in the fog layer. Instead of relying on training via the cloud, the present description describes how to train fog nodes within the fog layer over an extended period of time without interfering with the normal operations of the fog node. Specifically, by identifying when spare resources are available at the fog node, the fog node can utilize spare resources to perform metered training of the machine learning models associated with the fog node.

Furthermore, the present description also provides details regarding the sharing of trained machine learning models between similar fog nodes within the fog layer. The sharing of trained machine learning models involve identifying other similar fog nodes within the fog layer and determining whether the other similar fog nodes would benefit from sharing a machine learning model. The sharing of machine learning models between two or more fog nodes provides the ability for lesser trained fog nodes to speed up their training process by utilizing the training of another node.

Aspects of the subject technology relate to training machine learned models for fog nodes in the fog layer. Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Figure 1:
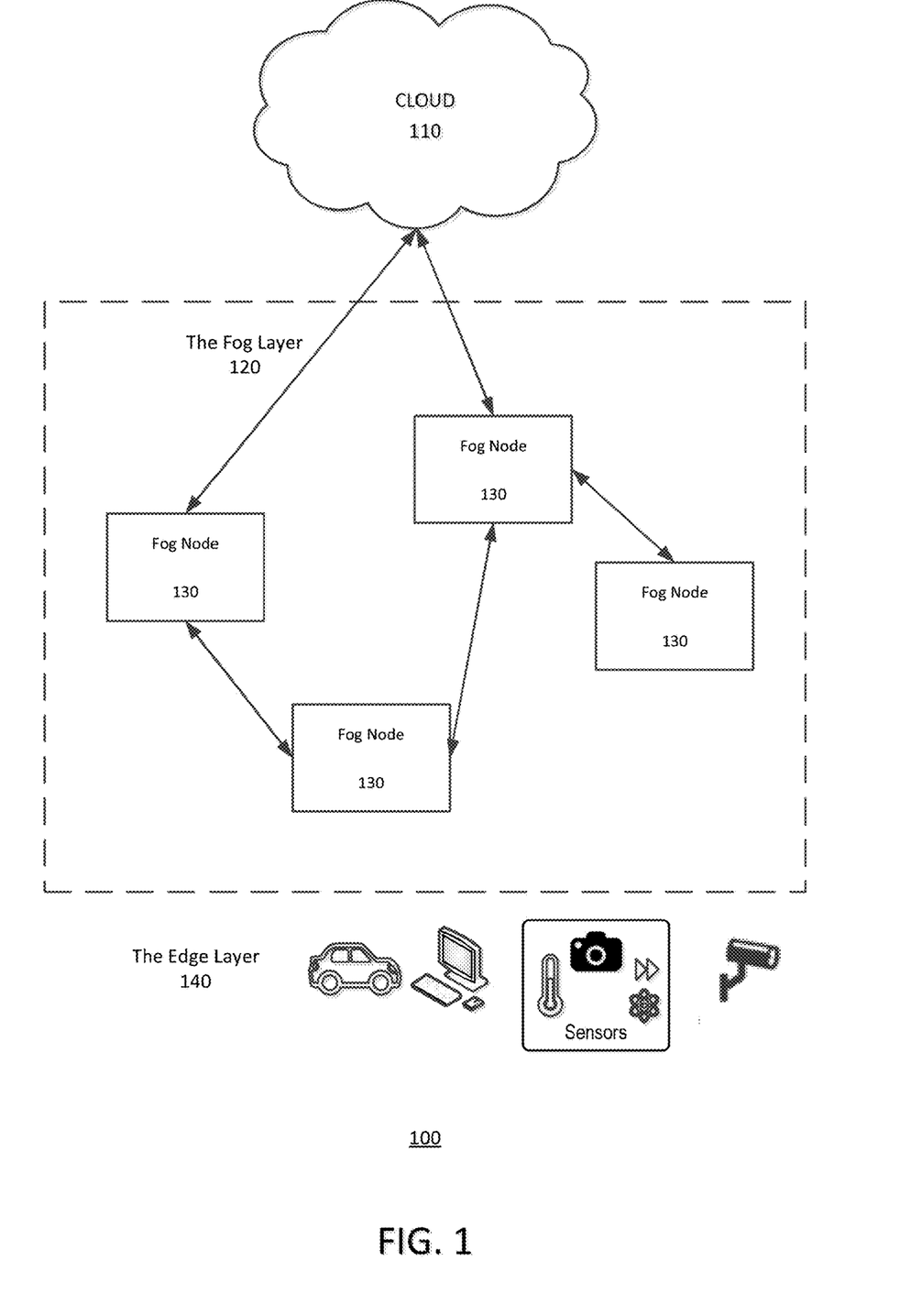
FIG. 1 is a conceptual block diagram illustrating an example network environment in accordance with various embodiments of the subject technology.

FIG. 1 is a conceptual block diagram illustrating an example network environment 100 in accordance with various embodiments of the subject technology. Various embodiments are discussed with respect to the example network environment 100, specifically how the machine learning models for the fog nodes 130 in the fog layer 120 can be trained without interfering with the normal operations of the fog node 130. Furthermore, the training of the machine learning models for the fog nodes 130 within the fog layer 120 (and not via the cloud 110) better reflects local network conditions associated with the fog node 130 within the fog layer 120. The training of the machine learning models provided at each fog node 130 can then be passed onto their respective edge devices that reside in the edge layer 140.

The cloud 110 is a shared pool of computing resources that can be rapidly provisioned over the Internet. This is carried out by using a network of remote servers that are hosted on the Internet to store, manage, and process data. In contrast, the fog layer 120 (in connection with fog computing) represents an architecture that uses edge devices (in the edge layer 140) to carry out substantial amounts of computation, storage, and communication locally where the data is originated and/or stored. The use of the fog layer 120 to complete computing tasks closer to the end users as opposed to sending the data to remote servers deeper into the cloud provides for benefits such as latency reduction and bandwidth savings that can provide better quality of service for the users. Furthermore, by processing data in the fog layer (e.g. using local edge devices) instead of cloud servers, contextual value of the local environment of the fog network associated with a fog node is also added to any analytics or machine learning model training as the data is processed closed to the source Within the fog layer 120 are numerous fog nodes 130. A fog node 130 can be seen as a collection of computing resources that is located in the fog layer 120 and that is associated with one or more edge devices in the edge layer 140. Based on the corresponding edge device, the fog node 130 may have various associated resources that can be used to carry out computing tasks within the fog layer 120.

Each fog node 130 can utilize an associated machine learning model that is used to optimize operations of the corresponding edge device in the edge layer 140. The machine learning model may generally be understood as an algorithm having a number of different parameters. The algorithm and parameters correspond to different aspects of how the corresponding edge device operates. Furthermore, the machine learning model can be established to optimize certain aspects of the edge device, for example, ensuring that the edge device works as intended or ensuring that the edge device is only turned on during times when it is needed so as to conserve resources (e.g. power) when the edge device is not in use.

For example, an exemplary edge device may be an automatic security camera. The machine learning model for the automatic security camera may be used to control how the automatic security camera performs its normal operation of capturing images of persons entering or leaving a location. The algorithms and parameters associated with the machine learning model for the automatic security camera may be used to define how the automatic security camera moves (e.g. direction and/or angle), what type of movements and the location of the movements that would trigger the automatic security camera to begin recording, how long the automatic security camera should continue recording after detecting movement, or how to identify if a person was properly recorded while the automatic security camera was recording.

The algorithms and parameters can be used, in connection with the automatic security camera, to ensure that the automatic security camera can properly capture images of any individual who walks by a particular location. Initially, the automatic security camera may be undertrained and can fail to capture the appropriate images of persons entering or leaving the location. For example, initial video from the automatic security camera may be determined to start too early, end too early, may not properly capture (e.g. center the image of) the person of interest in relation to a monitored location. The algorithms and the parameters associated with the machine learning model can then be modified, via training, so that the automatic camera can adjust when to begin and end recording images, where to monitor, and how to position the automatic security camera to better capture images of person entering or leaving a location.

Figure 2:
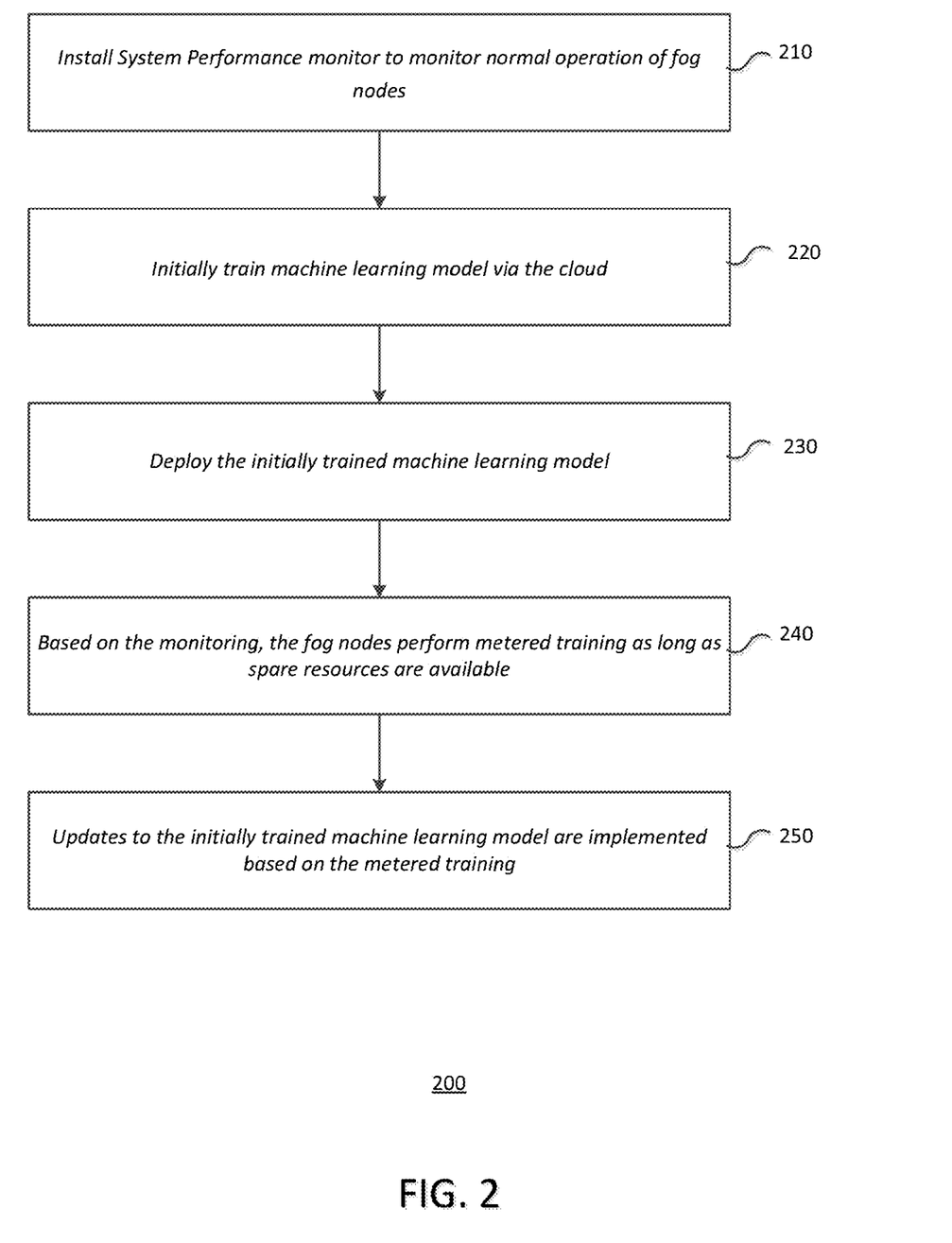
FIG. 2 shows an example process for training machine learning models of the fog nodes in the fog layer in accordance with various embodiments of the subject technology.

For the purposes of the present description, the edge devices in the edge layer 140 correspond to the various edge devices that operate at the edge of the cloud 110. Each edge device has a corresponding fog node 130 in the fog layer 120 that represents the resources that the edge device is capable of sharing with others with fog computing. With the presence of the "Internet of Things", everyday devices such as vehicles and home appliances now contain computing capabilities that can also be used to communicate with standard computing devices (such as desktops, laptops, smartphones, and tablets), would all be possible edge devices that can be used for fog computing FIG. 2 shows an example process 200 for training the machine learning models of the fog nodes in the fog layer in accordance with various embodiments of the subject technology. As described above, the training of the machine learned models of the fog nodes in the fog layer is performed at a metered pace whenever spare resources are available so as not to interfere with normal operations of the fog node. This allows the fog nodes to train the machine learning models over a long period of time so that the machine learning models can be continually updated without the need for the cloud. Furthermore, the training of the machine learning models within the fog layer (as opposed to using the cloud) maintains context (such as data and traffic behavior) arising from the surrounding environment of the fog layer that is associated with the fog node which is not maintained when the cloud is involved.

In order to not interfere with the normal operations of the edge devices in the edge layer, a system performance monitor (SPM) is installed on each of the fog nodes in the fog layer (step 210). Generally, the system performance monitor is a type of application that is capable of identifying, collecting, monitoring, and reporting an overall operational health of a computing device. In connection with the present application, the system performance monitor is used to collect and report on various characteristics associated with the normal operation of the fog node in the fog layer. In this way, the system performance monitor can identify a threshold amount of resources that are used during normal operations of the fog node and situations where spare resources are available. Exemplary metrics that can be used to quantify resources at the fog node can include (but are not limited to) the quantity of input-output (I/O) communications, how much processing is being performed at the fog node, and how much memory is being used to store data at the fog node.

By tracking the resources used by the fog node during normal operations, the system performance monitor can then generate reports that identify the resources that are generally required for normal operations by that fog node. These reports are used by the system performance monitor to then subsequently identify periods in time where spare resources may be available at the fog node. For example, if the fog node is currently operational but is not performing as many I/O communications as the fog node is capable of, the system performance monitor can flag the current period of time as a time where spare resources are available at the fog node. This situation may correspond to the fog node using a current amount of resources that is less than an amount of resources that are normally used. The difference between the amount of resources currently being used and the amount of resources that are normally used by the fog node correspond to the amount of spare resources that may be used for training. During these identified periods of time where there are spare resources available, the system performance monitor can inform the fog node that training on its machine learning model can be performed at this time.

In a next step, the machine learning model for each fog node can be initially defined or trained via the cloud (in step 220). Generally, the cloud can provide base-line training for each of the machine learning models. Although the cloud may not have specific context for each of the fog nodes in its environment within the fog layer, the cloud is still able to provide an estimate for algorithms and parameters associated with the machine learning model. Such estimates may be default values stored within the cloud (such as templates) or may be based on past machine learning models for other similar fog nodes.

Once the initially trained machine learning models have been created in the cloud, these machine learning models can then be deployed to their respective fog nodes (in step 230). The initially trained machine learning model can act as a starting point where subsequent training by the fog nodes in the fog layer as described herein can begin.

After being deployed to each fog node, the fog node can begin further training its machine learning model that was provided from the cloud using its locally relevant data from within the fog layer (in step 240). However, the further training of the machine learning model is performed at a metered pace with the goal of not interfering with the normal operations of the fog node. Therefore, normal operations for the fog node are prioritized over training of the machine learning model. Only when spare resources are available at the fog node will the fog node undergo any training of its machine learning model.

As described above (in step 210), the fog node needs to be able to identify and track its resource usage, for example, in connection with various computing tasks being performed in the fog layer via the system performance monitor. The system performance monitor informs the fog node when spare resources are available that are not currently being used for the normal operation of the fog node that can instead be allocated for training the machine learning model. Only then can the fog node initiate retraining processes that will use the allocated spare resources to train its machine learning model.

When the retraining process is performed by the fog node using the allocated spare resources, data streams associated with the fog node are sampled (via a sampling engine). Specifically, the sampling engine controls the amount of data being analyzed, and in turn the pace of learning, for the fog node. Information from the system performance monitor can be used to inform the sampling engine regarding the amount of data that can be analyzed so as to not overwhelm the fog node with large amounts of data. For example, based on an amount of spare resources available at the fog node, the sampling rate can be modified—if there are more spare resources, the fog node may take into account more data (e.g. higher sampling rate) compared to if there are less spare sources (e.g. use a lower sampling rate).

With the sampling engine, instead of looking at all the data within the fog layer associated with the fog node during the period of time that metered training can be performed, the sampling engine can perform sampled learning for the fog node where the sampling engine take samples of data that correspond to a current state of the fog layer associated with the fog node during the period of time. By allowing the fog node to process a sampled set of data (as opposed to all the data within the fog layer), this assists in the completion of the metered training with the spare resources that are available.

Furthermore the system performance monitor will continually track the current performance of the fog node in order to identify when the fog node will return to its normal operation (thereby indicating that the spare resources are no longer available at the fog node). When the system performance monitor identifies that the spare resources are now needed to perform the normal operations of the fog node, the fog node can then immediately terminate any current training processes that are in progress (as well as any future training processes that have been scheduled but not yet begun) and reallocate the spare resources as needed in order to minimize or prevent interference of the normal operation of the fog node. The last completed training session performed on the machine learning model by the fog node can then be pushed out to the edge device.

In a further embodiment, the system performance monitor may allow further training of the machine learning model by the fog node to continue being performed until an amount of resources required by the fog node reaches a pre-determined threshold amount. For example, if the fog node is allocated 100% of its resources for normal operation and currently the fog node is only using 60% of its resources that it would normally need, there would currently be 40% of its resources that may be available for training (e.g. spare resources). As time passes, the fog node may use more or less of its resources. However, if the system performance monitor determines that a pre-determined threshold amount of resources (e.g. 90%) is being used, the fog node may be notified that normal operations of the fog node may resume shortly. This may involve completing any current training sessions and terminating any future training sessions that have been scheduled. As opposed to the above scenario where training would be abruptly halted when no spare resources are available, the pre-determined threshold detection would allow the fog node to complete any ongoing training and smoothly transition back to normal operation.

This pre-determined threshold amount of resources can also be similarly used to identify a pre-determined amount of spare resources that may be needed before any training can begin on the fog node. This ensures that an appropriate amount of spare resources are at least available to perform training and that a training session can at least be completed before the fog node reverts back to normal operations.

With the metered training that is performed via step 240, the machine learning model for the fog node can be updated gradually over time in step 240. Although initially undertrained, the machine learning model for each fog node becomes more optimized as the training performed at the fog node occurs over a long period of time. The updated machine learning models can be provided to their respective edge devices in the edge layer in order to optimize their operations.

The above method of metered training of the machine learning model is performed without the need to communicate with the cloud. This provides for less traffic and resources that is required from the cloud to train and maintain the machine learning models at the fog nodes. Furthermore, each of the fog nodes can maintain its contextual data in the fog layer as the machine learning models are being trained with information from fog layer associated with the fog node.

Figure 3:
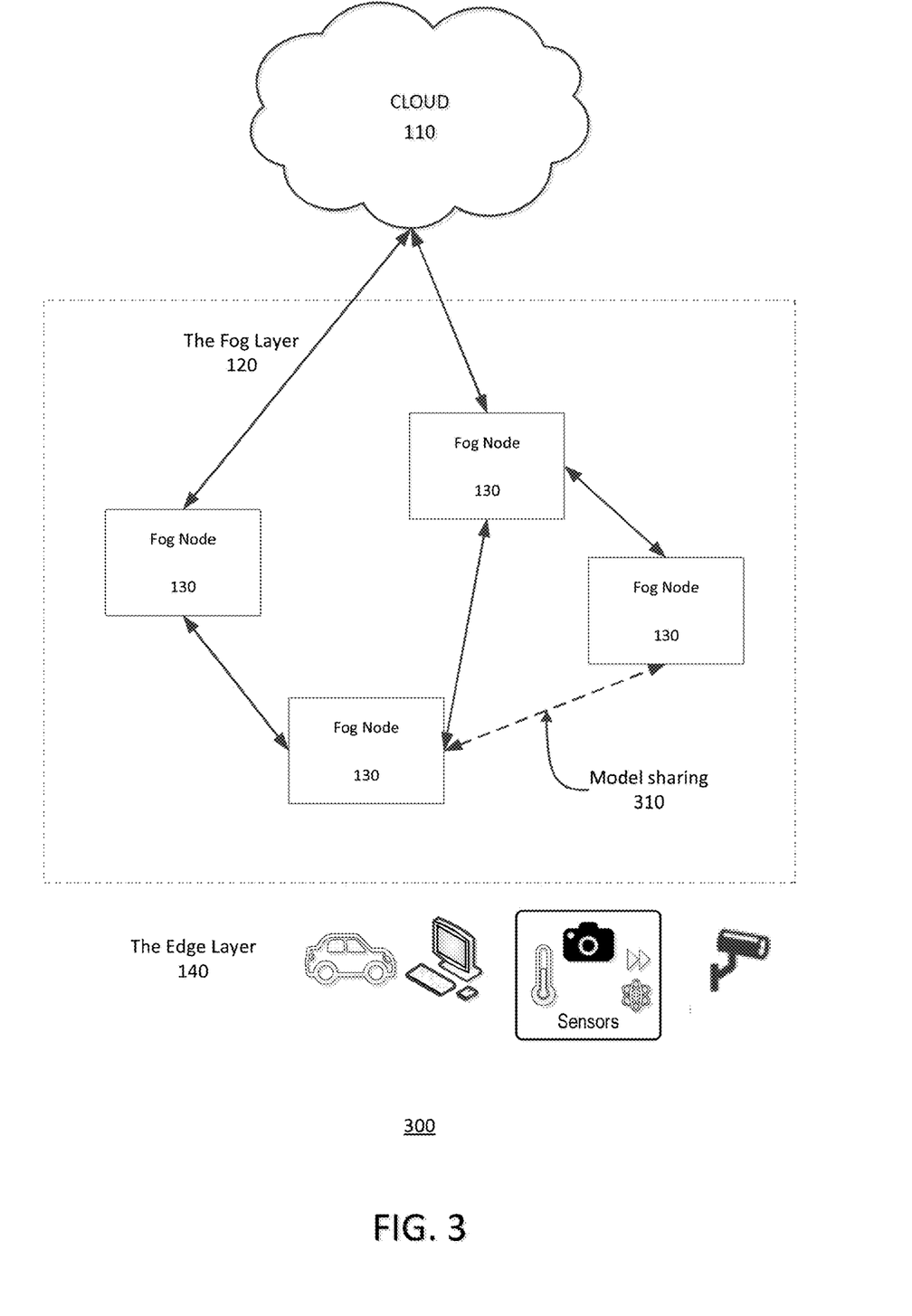
FIG. 3 is a conceptual block diagram illustrating an example network environment that illustrates fog nodes sharing machine learning models with other similar fog nodes in accordance with various embodiments of the subject technology.

FIG. 3 is a conceptual block diagram illustrating an example network environment 300 that illustrates fog nodes 130 sharing machine learning models (310) with other similar fog nodes 130 in accordance with various embodiments of the subject technology. Similar to the network environment illustrated in FIG. 1 where each fog node 130 within the fog layer 120 can perform training on their own respective machine learning models, FIG. 3 further illustrates the ability of fog nodes 130 to share their trained machine learning models (310) with other similar fog nodes 130 within the fog layer 120.

Although each fog node is capable of training its own machine learning model, the process illustrated in FIG. 3 allows fog nodes to possibly speed up training of other similar fog nodes within the fog layer by sharing its machine learning model if it is determined to be better trained and potentially useful for the other similar fog nodes.

The speeding up is realized because the other similar fog nodes will be able to utilize the better trained machine learning model from the fog node sharing its machine learning model as a jumping off point in subsequent trainings by that fog node. Since training of machine learning models can take time and may require large amounts of data to properly train, the use of models of similar fog nodes that have already been trained in connection with newer fog nodes can allow the new fog nodes to take advantage of all the past training that has already been performed (which essentially speeds up the training of the new fog node). For example, that fog node sharing its machine learning model may have been able to optimize operation of its edge device based on its current location via the training it has performed in the fog layer. Other similar fog nodes would be able to utilize the shared machine learning model to better optimize their edge devices but may require additional training specific to their respective locations. In any case, the fog node would not need to start from scratch and can rely on past training from the similar fog nodes.

The determination of what other fog nodes should be shared a better trained machine learning model takes into consideration at least: 1) identifying what other fog nodes are similar (e.g. nearby) to the better trained fog node so that the better trained machine learning model would be useful in optimizing the lesser trained machine learning model and 2) whether the sharing of the better trained machine learning model would actually be beneficial to the fog node with the lesser trained machine learning model. Generally accuracy is an indicator that the better trained machine learning model would be beneficial for the lesser trained machine learning model. For example, if two similar fog nodes perform the same task but the better trained machine earning model is able to configure their corresponding edge device to perform the task more accurately, that may be indicative that the lesser trained machine learning model would benefit from using better trained machine learning model. However, accuracy may not be the only indicator of whether a machine learning model is beneficial. Users may be capable of identifying what other factors are possible for comparing performance of the machine learning models to identify whether the better trained machine learning model is beneficial. Further details are provided below in FIG. 4.

Figure 4:
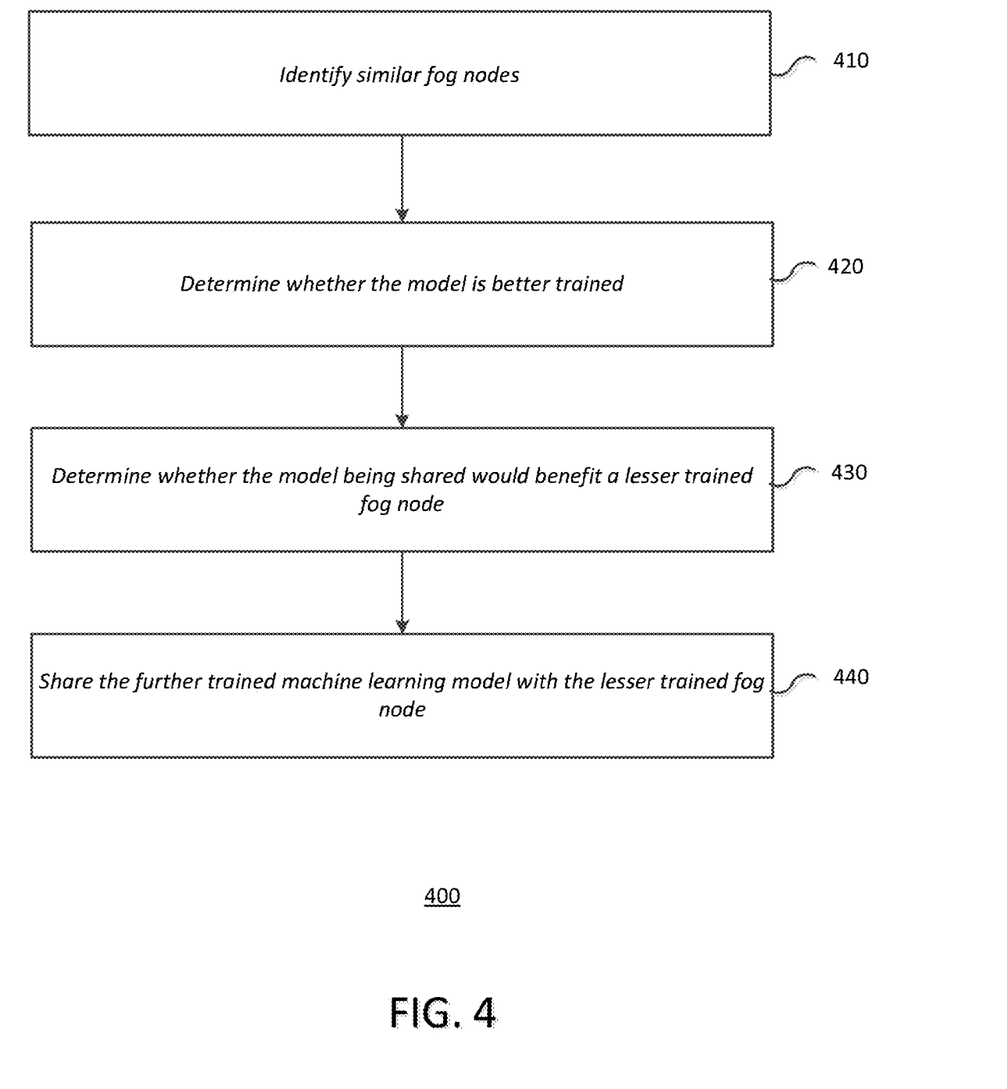
FIG. 4 shows an example process for sharing trained machine learning models in the fog layer between fog nodes in accordance with various embodiments of the subject technology.

FIG. 4 shows an example process 400 for sharing trained machine learning models in the fog layer between fog nodes in accordance with various embodiments of the subject technology. Specifically, fog nodes that have machine learning models that are better trained than other fog nodes within the fog layer can share their models in order to assist in the training of these other fog nodes. For example, with the situation of fog nodes with machine learning models with less accuracy models than other fog nodes with more accurate models, the fog nodes with the less accurate models can instead use shared machine learning models from fog nodes with more accurate models in order to benefit from the more accurate model. Although the shared machine learning model may not be optimized for the particular fog node/edge device, the shared model may require less work to optimize compared to starting off with a less accurate model (e.g. template from the cloud server).

In step 410, a fog node having a better trained (e.g. more accurate) machine learning model would first identify other similar fog nodes that could benefit from being shared its machine learning model. Other fog node could be considered similar based on an overall evaluation regarding 1) whether the other fog nodes are nearby (either physically or within the fog layer) of the better trained fog node and 2) whether the machine learning model of the other fog nodes share characteristics with the better trained machine learning model of the fog node wanting to share its machine learning model.

Other fog nodes being considered nearby could take into account the physical location of the corresponding edge devices in the edge layer in which case a threshold distance could be used. Furthermore, nearby could also be based on the location of fog nodes within the overall fog layer (e.g. its place in the network as opposed to its physical location). The location of the fog nodes could be based on, for example, Internet Protocol (IP) addresses or other similar identifiers that provide a comparative location of each fog node within the fog layer. Various pre-determined thresholds could be used to determine what is considered nearby within the fog layer, such as latency with respect to communications between two fog nodes. It should be noted that it is also possible to consider both the physical location and the location within the fog layer to identify which of the other fog nodes are considered nearby the better trained fog node.

The importance of looking at the characteristics of the other fog nodes being nearby the better trained fog node could be manifold. For example, edge devices that are physically nearby may share similar characteristics within their surrounding environment. An edge device that is responsible for controlling the temperature for one building based on outside environment considerations could have its corresponding machine learning model shared with other edge devices that also control temperatures for different buildings within the same area (e.g. neighborhood, city). Additionally fog nodes that are considered nearby may have lower latencies that would facilitate communication between the two nodes or share similar context within the fog layer that would be used to similarly train their respective machine learning model. This may be desired in situations where two fog nodes are constantly sharing their respective machine learning models with each other.

Just as important as looking at the location of the other fog nodes, a determination of similarity also takes into account the characteristics of the machine learning models of the other fog nodes and corresponding edge devices. Generally, other fog nodes would more likely benefit from the sharing of the better trained machine learning model if the other fog nodes have characteristics that are the same or substantially similar. For example, fog nodes that share similar or the same machine learning models (e.g. algorithms and/or parameters) are more likely to be considered similar with each other. Furthermore, consideration on the similarity of the corresponding edge devices and related functionality can be used to determine whether the fog nodes are similar.

The determination of what machine learning models and/or edge devices are similar enough can be performed by evaluating a multi-variable learning problem. Various variables such as types of data, similarities in the features of the machine learning model/edge devices, and number of dimensions can be identified and weighted. The variables and weights can be customized by the user. An algorithm, based on the variables and weights, and then be generated to process the characteristics of the fog nodes. A pre-determined threshold can be used to identify those machine learning models of fog nodes and/or edge devices that are similar based on the output of the algorithm in comparison to the pre-determined threshold. The fog nodes and/or edge devices that do not meet the pre-determined threshold would be identified as not being similar enough (e.g. different) and their machine learning models would not likely be useful if shared.

The determination of similarity is used to ensure that the machine learning model being shared from a better trained fog node would be useful to other fog nodes. With the security camera example provided above, two different security cameras at two different buildings may be determined to be similar based on their functionality. However the machine learning model for a security camera would be of little use for a different edge device that is not a security camera such as a smart appliance that controls the building's air conditioning).

However, even if two fog nodes are considered similar, there may be significant factors associated with the local environment of a fog node or local environment of the edge device that would not lend itself to using the machine learning model of another fog node or edge device. For example, an edge device that is responsible for controlling the temperature of a server room would utilize different algorithms and/or parameters than an edge device that is responsible for controlling the temperature of an office. That is why a determination regarding whether the lesser trained fog node would benefit from being shared a machine learning model is also performed (see step 430).

Next, the fog node can identify whether its machine learning model can be seen as being better trained (model performs with higher accuracy/efficiency) than other machine learning models of other fog nodes (in step 420). Generally, determination of whether a machine learning model is better trained would be based on the accuracy or efficiency of the model on its corresponding edge device. Specifically, the machine learning model is used to optimize the performance of the designated functions for the edge device. Therefore, an edge device that is closer to being optimized with regards to performing their designated functions could be identified as being better trained compared to a different edge device that is not able to perform the designated function as efficiently.

To identify whether the machine learning model from one fog node is actually better trained (in step 420), tests can be initiated that uses the machine learning model that will be shared against test data. Calculations of accuracy/efficiency and comparisons between the outcomes of the machine learning model and the test data can identify whether the machine learning model would actually improve the accuracy/efficiency of the fog node in performing its function. If so, the machine learning model can then be identified as being better trained and be offered for sharing to other fog nodes.

In step 430, an evaluation of the machine learning model being shared is performed in order to determine whether the lesser trained fog node would benefit in using the shared machine learning model provided from another fog node. The accuracy/efficiency of the other machine learning model is calculated and compared with the last determined efficiency of the machine learning model of the lesser trained fog node. The calculation of the shared machine learning model may, for example, involve using the shared machine learning model for a pre-determined period of time on the corresponding edge device of the lesser trained fog node and then reverting back to the previous machine learning model if the efficiency of the shared machine learning model on the edge device of the lesser trained fog node does not improve the efficiency of that edge device. If for instance the edge device is able to perform its function with 89% accuracy using the shared machine learning model while the use of its own machine learning model yields a result that is only 48% accurate, this may be interpreted that the better trained machine learning model being shared would be better for the other fog node and that the shared machine learning model should replace the machine learning model currently associated with the other fog node.

Once it is confirmed that the shared machine learning model would be useful to the lesser trained fog node, the shared machine learning model can be provided to the lesser trained fog node in step 440. In this way, the training of the lesser trained fog node that previously had a less accurate machine learning model could be sped up. The speed up in the training process for the fog node which would better optimize the corresponding edge device in a shorter period of time compared to if the fog node was allowed to perform its own training.

In some situations, the sharing of machine learning models can be continually performed between a group of two or more fog nodes based on which fog node has had the opportunity to perform training. For example, there may be situations where one or more fog nodes have spare resources more frequently or for a longer period of time thereby allowing that fog node to train for a longer period of time. Therefore, determining whether sharing the machine learning models after one fog node of the group of two or more fog nodes completes a training session may be desired. By continually sharing the machine learning models between groups of similar fog nodes after one fog node within the group completes a training session, this could be seen as increasing the opportunities that each of the fog nodes have in training their machine learning models within the fog layer by taking into account the availability of resources present at other fog nodes (and not just looking at their own).

Figure 5A:
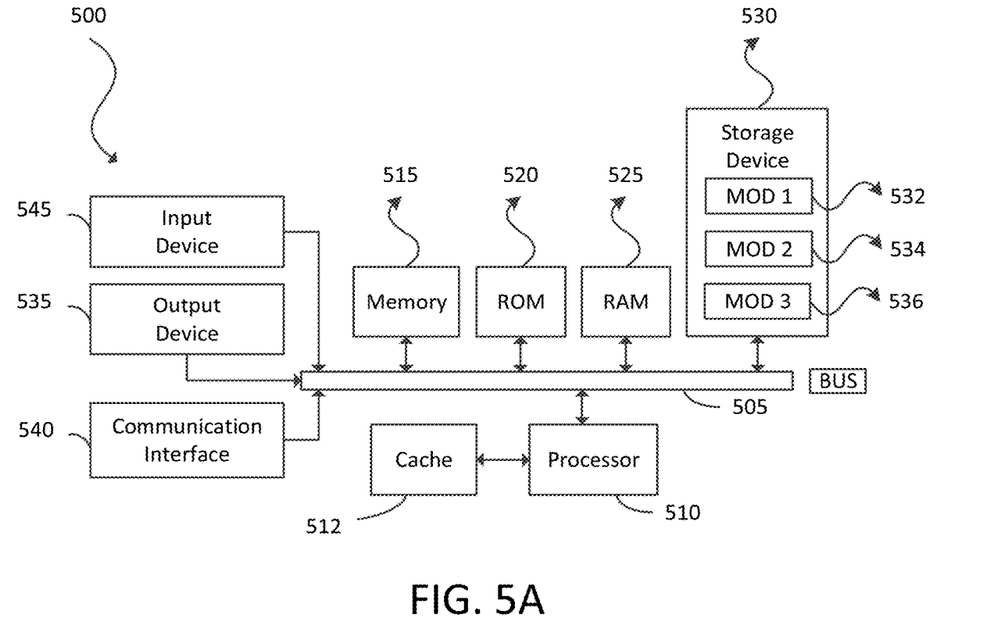
FIG. 5A and FIG. 5B illustrate examples of systems in accordance with some embodiments.
Figure 5B:
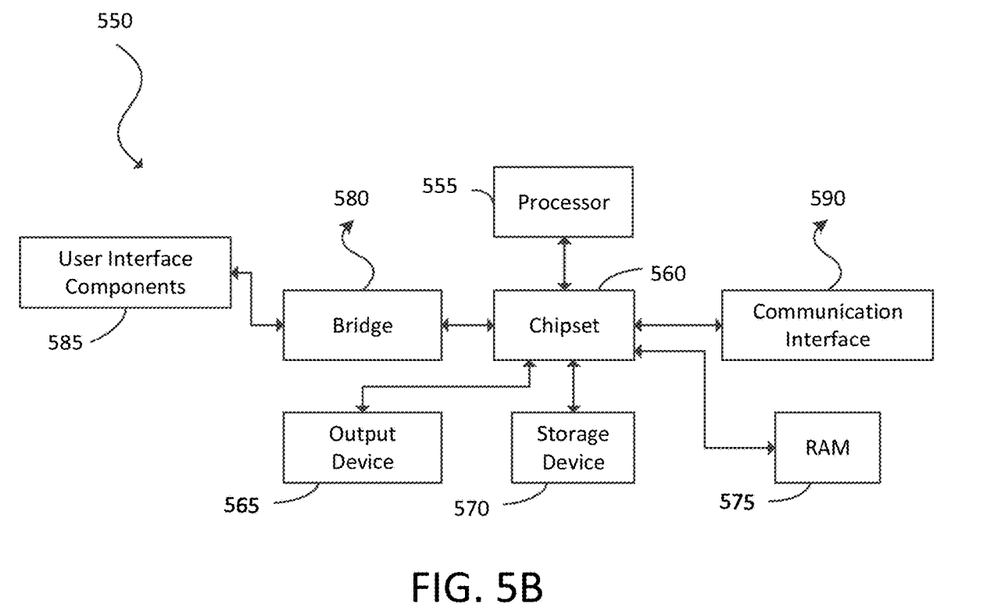

FIG. 5A and FIG. 5B illustrate systems in accordance with various embodiments. For example, the illustrated systems may correspond to one or more edge devices within the edge layer as illustrated in FIG. 1 and FIG. 3. The more appropriate system will be apparent to those of ordinary skill in the art when practicing the various embodiments. Persons of ordinary skill in the art will also readily appreciate that other systems are possible.

FIG. 5A illustrates an example architecture for a conventional bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) in a storage device 520 and random access memory (RAM) 525, to the processor 510. The computing system 500 can include a cache 512 of high-speed memory connected directly with, in close proximity to, or integrated as part of the processor 510. The computing system 500 can copy data from the memory 515 and/or the storage device 530 to the cache 512 for quick access by the processor 510. In this way, the cache 512 can provide a performance boost that avoids processor delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 645 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

Storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory (RAM) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out the function.

FIG. 5B illustrates an example architecture for a conventional chipset computing system 550 that can be used in accordance with an embodiment. Similar to FIG. 5A, the computing system 550 can correspond to one or more of the edge devices within the edge layer illustrated in FIG. 1 and FIG. 3. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, and solid state media, for example. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless local area networks (LANs), for broadband wireless networks, as well as personal area networks. Some applications of the methods for generating, displaying, and using the graphical user interface (GUI) disclosed herein can include receiving ordered datasets over the physical interface or be generated by the machine itself by processor 555 analyzing data stored in the storage device 570 or the RAM 575. Further, the computing system 500 can receive inputs from a user via the user interface components 585 and execute appropriate functions, such as browsing functions by interpreting these inputs using the processor 555

It will be appreciated that computing systems 500 and 550 can have more than one processor 510 and 555, respectively, or be part of a group or cluster of computing devices networked together to provide greater processing capability For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, universal serial bus (USB) devices provided with non-volatile memory, networked storage devices, and so on.

Devices implementing methods according to these disclosures can comprise hardware, firmware, and/or software, and can take any of a variety of form factors. Non-limiting examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for training a fog node in a fog layer, the method comprising:
receiving a machine learning model for the fog node from a cloud, wherein the cloud provides the machine learning model with its initial training, the machine learning model being used to optimize performance of at least the fog node at the fog layer;
monitoring resources being used at the fog node, wherein a threshold amount of resources is identified as being an amount of resources needed for normal operations of the fog node;
identifying an amount of spare resources that are available, wherein the amount of spare resources corresponds to a difference between a current amount of resources being used that is less than the amount of resources needed for normal operations of the fog node;
allocating the identified amount of spare resources for metered training of the machine learning model of the fog node, wherein:
the metered training prioritizes normal operation of the fog node over training the machine learning model; and
the metered training of the machine learning model is performed using a sampled data set that is based on the amount of spare resources available to the fog node; and
training the machine learning model of the fog node using the identified amount of spare resources, wherein the training of the machine learning model is performed so long as the amount of spare resources are available at the fog node.

2. The computer-implemented method of claim 1, wherein the monitoring is performed by a system performance monitor that is installed on the fog node.

3. The computer-implemented method of claim 1, further comprising automatically terminating a current training session of the machine learning model when the spare resources are no longer available at the fog node.

4. The computer-implemented method of claim 1, further comprising automatically terminating future training sessions and completing current training sessions of the machine learning model when an amount of spare resources available at the fog node falls below a pre-determined threshold amount.

5. The computer-implemented method of claim 1, wherein the machine learning model received from the cloud is an initially trained machine learning model from the cloud that uses default values or past machine learning models of similar fog nodes stored within the cloud.

6. A non-transitory computer-readable medium comprising instructions for training a fog node in a fog layer, the instructions, when executed by a computing system, cause the computing system to:
receive a machine learning model for the fog node from a cloud, wherein the cloud provides the machine learning model with its initial training the machine learning model being used to optimize performance of at least the fog node at the fog layer;
monitor resources being used at the fog node, wherein a threshold amount of resources is identified as being an amount of resources needed for normal operations of the fog node;
identify an amount of spare resources that are available, wherein the amount of spare resources corresponds to a difference between a current amount of resources being used that is less than the amount of resources needed for normal operations of the fog node;
allocate the identified amount of spare resources for metered training of the machine learning model of the fog node, wherein:

the metered training prioritizes normal operation of the fog node over training the machine learning model; and the metered training of the machine learning model is performed using a sampled data set that is based on the amount of spare resources available to the fog node; and train the machine learning model of the fog node using the identified amount of spare resources, wherein the training of the machine learning model is performed so long as the amount of spare resources are available at the fog node.

7. The non-transitory computer-readable medium of claim 6, wherein the instructions further monitor the fog node to identify when spare resources are no longer available.

8. The non-transitory computer-readable medium of claim 7, wherein the instructions further terminate a current training session of the machine learning model based on identifying that the spare resources are no longer available at the fog node.

9. A system for training a fog node in a fog layer, the system comprising:

a processor; and a non-transitory computer-readable medium storing instructions that, when executed by the system, cause the system to:

receiving, from a cloud, an initially trained machine learning model for a fog node within a fog layer the machine learning model being used to optimize performance of at least the fog node at the fog layer;

monitor resources being used at the fog node, wherein a threshold amount of resources is identified as being an amount of resources needed for normal operations of the fog node;

identify an amount of spare resources that are available, wherein the amount of spare resources corresponds to a difference between a current amount of resources being used that is less than the amount of resources needed for normal operations of the fog node;

allocate the identified amount of spare resources for metered training of the machine learning model of the fog node, wherein:

the metered training prioritizes normal operation of the fog node over training the machine learning model; and the metered training of the machine learning model is performed using a sampled data set that is based on the amount of spare resources available to the fog node; and train the machine learning model of the fog node using the identified amount of spare resources, wherein the training of the machine learning model is performed so long as the amount of spare resources are available at the fog node.

10. The system of claim 9, wherein the instructions further cause the system to monitor the fog node to identify when spare resources are no longer available.

11. The system of claim 10, wherein the instructions further cause the system to terminate a current training session of the machine learning model based on identifying that the spare resources are no longer available at the fog node.

* * * * *